July 3, 1928.
H. CSANYI
1,676,007
BATTERY CELL
Filed May 26, 1926
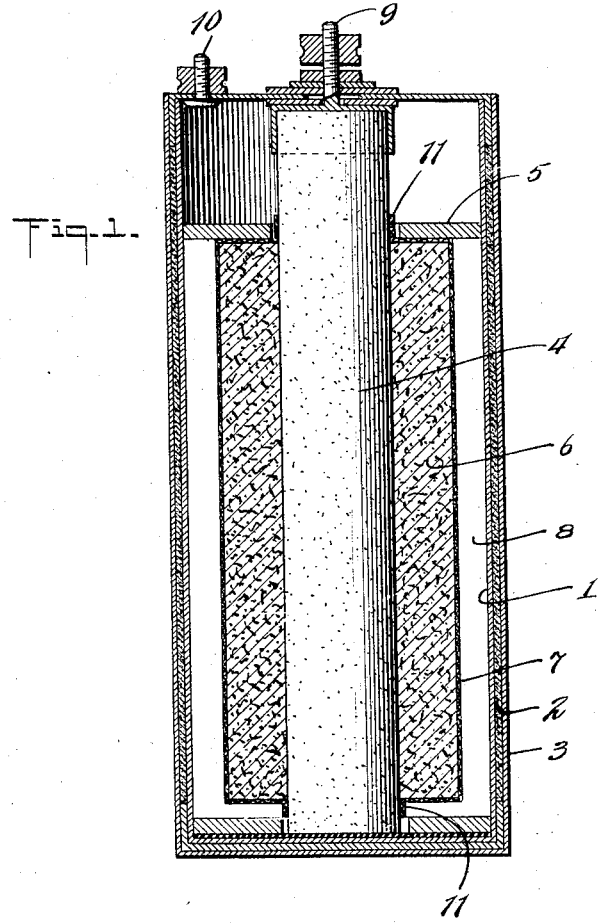
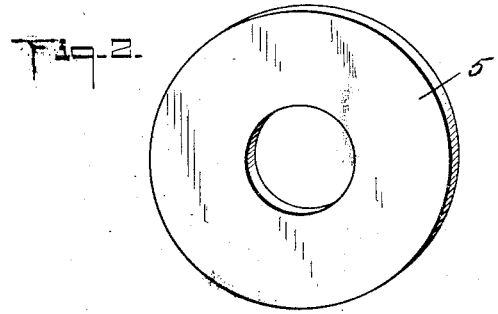
INVENTOR
HENRY CSANYI
BY
J. Granville Meyers.
ATTORNEY Patented July 3, 1928.

1,676,007

UNITED STATES PATENT OFFICE.

HENRY CSANYI, OF NEW YORK, N. Y.

BATTERY CELL.

Application filed May 26, 1926. Serial No. 111,682.

This invention is an improvement in electric batteries, and more specifically in dry cell batteries capable of being recharged.

In the cells of the Le Clanche or ammonium chlorid type, the electrolyte which is ammonium chlorid reacts with the zinc of the negative electrode, displacing an atom of hydrogen, which reacts with the oxygen of the manganese dioxide in the depolarizing mixture to form water, and the ammonia ($NH_3$) has an alkaline effect in the cell.

When in use, there is a constant reaction of this character, with a continuous deterioration of the cell, which when exhausted is useless, since it is incapable of regeneration. So far as I am aware in the improvements heretofore made in cells of this type, no provision has been made for the combination of the ammonium ($NH_4$) in the cell.

One of the objects of the present invention is the provision of a cell of the character in question, which is in effect to a certain extent self regenerating, and which when exhausted under the usual conditions of use, may be recharged, thus converting the primary cell into a secondary cell.

Another object is to provide a cell or battery, especially designed for relatively long periods of continuous use, for instance in radio work, without deterioration, and one which may be used as a floating cell or battery, delivering the required current to the apparatus with which it is used, while simultaneously receiving a current of like value from a suitable source, as for instance a lighting circuit.

With these objects in view, I include in the depolarizing mixture a suitable neutralizing agent for the ammonium, which will combine therewith in the cell. This agent may be the chlorid of any suitable tri-valent metal of a higher potential than the negative pole.

A preferred combination is with a Le Clanche foundation, having carbon and zinc for the positive and negative poles respectively, manganese dioxide and carbon flour for the depolarizing mixture, and a solution of ammonium chlorid as the electrolyte, the following For the depolarizing mixture:

|   | Per cent. |
|---|---|
| Carbon (C) flour, or natural or artificial graphite (the latter to increase conductivity) | 25 |
| Manganese hydroxid (MnOH) | 5 |
| Ammonium chlorid ($NH_4Cl$) | 3 |
| Manganese dioxide ($MnO_2$) | 67 |

These substances should be well mixed and to the mixture should be added a suitable percentage of an agent which will react with the ammoniac or ammonium in the cell in the following manner:

$$XCl_3 + 3NH_4OH = X(OH)_3 + 3NH_4Cl.$$

In this equation $XCl_3$ represents a tri-valent metal of a higher potential than zinc.

The said agent is prepared in the following manner:

|   | Per cent. |
|---|---|
| Water ($H_2O$) | 60 |
| Ammonium chlorid ($NH_4Cl$) | 20 |
| Chlorid of a tri-valent metal ($XCl_3$) | 20 |

The tri-valent metal may be any metal having the characteristics specified that is of a higher potential than the negative electrode, combined with chlorin in the manner specified, and reacting with the ammonium as above stated.

The inclusion of manganese hydroxide in the depolarizing mixture is necessary to the proper operation thereof. Without it the hydrogen does not combine, but occurs in the gaseous form.

In discharging the cell the following reaction takes place:

Negative :—$Zn + 2NH_4Cl = ZnCl_2 + H_2 + 2NH_3$.

Positive :—$MnO_2 + H_2 = Mn_2O_3 + H_2O$.

Neutralization :—$2NH_3 + AlCl_3 + 3MnO(OH) = Al + 2NH_4Cl + HCl + 3MnO_2$.

In charging, the zinc chloride is decomposed, the zinc passing to the negative electrode, and the chlorine to the depolarizer.

The improved cell or battery is used in the usual manner, and since it is self-regenerating to a certain extent, it will have a much longer life than the usual cell. Furthermore, when it has been exhausted it may be recharged, from the usual lighting circuit, with the interposition of a series type lamp of a wattage dependent on the type of battery, on direct current, and with the addition of a rectifier in series on alternating current.

With a radio "B" battery, for instance, a 15 watt lamp should be used, connecting the negative and positive terminals of the lamp to the corresponding terminals of the battery. The procedure is the same for the 6 inch type battery with the exception that a 100 watt series lamp is used. The recharging of the "B" battery requires about 8 hours, while that of the 6 inch type requires about 10 hours. The direction of the current flow from the lamp may be determined by placing both wires in water. That wire about which the gases freely collect is the negative pole, and should be connected to the negative pole of the battery.

The improved battery may also be used with radio "A" batteries on a floating action, in such manner that the current consumed by the apparatus is replaced from a lighting circuit in the same ratio. For instance, with a three tube set on U V 201 a 75 watt series lamp should be used, since each tube lamp consumes .25 amperes, making a total of .75 amperes. This multiplied by the voltage of 110 gives approximately 75 watts.

With the "A" battery connected to a series lamp as above described, whenever the battery circuit is closed, with the light burning, the battery will be recharged at the same rate that it is discharged.

While the improved cell or battery may be constructed in accordance with any preferred type, I have shown in the drawings forming a part hereof a preferred construction, the construction being that shown and described in my Patent Number 1,401,676, granted December 22, 1921.

In the drawings:

Fig. 1 is a vertical section of the improved cell.

Fig. 2 is a perspective view of one of the spacing disks.

The improved cell includes a suitable casing or container 1 of zinc or the like forming the negative electrode which is preferably coated externally with coal tar or the like, and the coating is faced with a suitable insulating envelope 3, of paper or the like.

The positive electrode 4 of carbon or the like is centrally arranged and so held by spacing disk 5, the said disk being arranged at the bottom of the casing 1, and in spaced relation with respect to the top thereof and to the top of the electrode 4, which is substantially flush with the top of the casing.

The depolarizer 6 which is paste-like surrounds the positive electrode, and is supported by a thin pervious fabric 7, such as cheesecloth or the like, the said depolarizer extending from the upper spacing disk to near the lower disk, being separated from the lower disk by a thin layer of the electrolyte indicated at 8.

The disk 5 properly centers the positive electrode and its depolarizer, relative to the negative electrode, thereby to provide a uniform annular space or chamber for the reception of the electrolyte. The peripheral edges of the spacing disks contact firmly with the casing wall, and the top disk acts to cover and confine the electrolyte against splashing.

Referring to Fig. 1 it will be noticed that there is an annular chamber provided above the top spacing disk 5, between said disk and the top of the casing 1. The terminal 9 of the positive electrode extends through the top of the casing, being insulated therefrom as shown, and the terminal 10 for the negative electrode is arranged near the peripheral wall of the casing. The ends of the fabric 7 which supports the depolarizer are formed into collars, which are pasted or otherwise secured to the positive electrode as indicated at 11.

When the battery is completely assembled, as will be understood by reference to Fig. 1, a completely closed and sealed structure is provided, wherein spilling and splashing of the electrolyte is prevented, and wherein great efficiency in chemical reaction and in current distribution is obtained.

A suitable tri-valent metal, when zinc is the negative electrode, is aluminum chlorid, and this substance will react with the ammoniac or ammonium as indicated in the formula, forming aluminum hydroxid and ammonium chlorid.

What is claimed is:

1. A dry cell having a depolarizing mixture including manganese hydroxide, and the chlorid of a tri-valent metal of a higher potential than the negative electrode of the cell.

2. A dry cell having a depolarizing mixture including manganese hydroxide, and the chlorid of a tri-valent metal of a higher potential than the negative electrode of the cell, and capable of reacting with the ammonium in the cell to neutralize the ammonium by the formation of ammonium chlorid.

3. A battery cell including a negative electrode of metal, a positive electrode of carbon, an electrolyte including ammonium chlorid, and a depolarizing mixture including manganese hydroxide, and the chlorid of a tri-valent metal of a higher potential than the negative electrode.

4. A battery cell including a negative electrode of metal, a positive electrode of carbon, an electrolyte including ammonium chlorid, and a depolarizing mixture of carbon, manganese hydroxide, manganese dioxide, and including the chlorid of a tri-valent metal of a higher potential than the negative electrode.

5. An ammonium chlorid cell containing a depolarizing mixture including manganese hydroxide, and the chlorid of a tri-valent metal of a higher potential than the negative electrode of the cell.

6. An ammonium chlorid cell including a negative electrode of metal, a positive electrode of carbon, an electrolyte including ammonium chlorid, and a depolarizer including manganese hydroxide, and the chlorid of a tri-valent metal of a higher potential than the negative electrode of the cell.

7. A primary battery cell of the ammonium chloride type, capable of recharging as a secondary, containing a depolarizer including carbon, manganese hydroxide, manganese dioxide, and the chloride of a trivalent metal of a higher potential than the negative electrode of the cell, to neutralize the ammonium produced during the discharge of the cell by the formation of chloride of ammonium, and the trivalent metal in a free state.

Signed at New York city in the county of New York and State of New York this 22nd day of May A. D. 1926.

HENRY CSANYI.